(No Model.)

J. KENT.
HUB ATTACHING DEVICE.

No. 359,262. Patented Mar. 15, 1887.

Witnesses.
S. N. Piper.
H. B. Towey.

Inventor.
Joseph Kent.
by R. H. Eddy atty.

UNITED STATES PATENT OFFICE.

JOSEPH KENT, OF WINDSOR, VERMONT, ASSIGNOR, BY MESNE ASSIGNMENTS, TO HIMSELF AND WILLIAM LACY, OF SAME PLACE.

HUB-ATTACHING DEVICE.

SPECIFICATION forming part of Letters Patent No. 359,262, dated March 15, 1887.

Application filed August 16, 1886. Serial No. 210,997. (No model.)

*To all whom it may concern:*

Be it known that I, JOSEPH KENT, of Windsor, in the county of Windsor, of the State of Vermont, have invented a new and useful Improvement in Mechanism for Securing a Carriage-Wheel upon the Journal of its Axle; and I do hereby declare the same to be described in the following specification, and represented in the accompanying drawings, of which—

Figure 1:
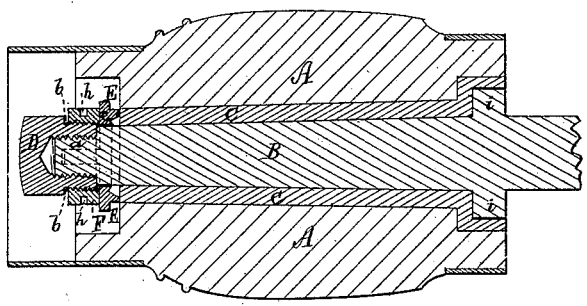
Figure 2:
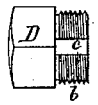
Figure 3:
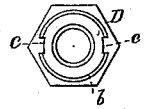
Figure 4:
Figure 5:
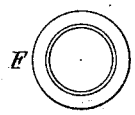
Figure 6:
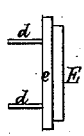
Figure 7:
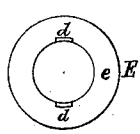
Figure 8:
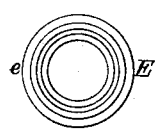
Figure 9:
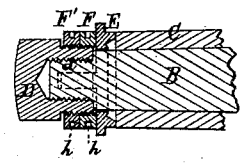

Figure 1 is a lengthwise section of a wheel-hub and axle-journal with my invention applied thereto. Fig. 2 is a side view, and Fig. 3 an inner end view, of the nut that, in Fig. 1, is shown as screwed upon the outer end portion of the axle. Fig. 4 is a transverse section, and Fig. 5 an end view, of the ring that is screwed upon the nut. Fig. 6 is an edge view, Fig. 7 an outer side elevation, and Fig. 8 an inner side view, of the "wear-compensator," hereinafter described. Fig. 9 is a longitudinal section of the nut and wear-compensator, and two rings screwed upon the nut, one of such rings serving the duty of a fastener to the other.

The nature of my invention is defined in the claim, hereinafter presented.

In Fig. 1 of the drawings, A denotes a wheel-hub provided with a sleeve or box, C, to receive the axle-journal B, having, as usual, at its outer end a male screw, a, upon which is screwed a nut, D. The said nut is screw-threaded externally as well as interiorly, the external screw being shown at b in Fig. 2. Furthermore, there extends through the external screw, b, lengthwise of it and on opposite sides of it, two grooves, c c, that receive two prongs, d d, projecting from an annulus, e, encompassing the journal B, and butting against the wheel-hub or the outer end of its box. The annulus with its prongs I term the "wear-compensator" E, its operation and purpose being hereinafter explained.

On the external screw of the nut there is screwed a single ring, F, as shown in Fig. 1, or two such rings, as shown at F and F' in Fig. 9, that marked F' serving as a fastener or "set-nut" to the other, to keep it, when screwed up against it, from accidentally revolving on the nut.

Each of the rings F and F' may have a cylindrical periphery and one or more holes, $h$, therein, to receive a spanner for revolving such ring; or said ring may be prismatic, or have a perimeter, to receive a wrench for effecting the turning of the ring on the screw.

As the wheel-hub box and the shoulder $i$ of the journal may become worn from time to time, the wear-compensator may be set up or moved up to the box by means of the ring F, by turning the latter in the right direction on the nut. Thus it will be seen that the said wear-compensator serves to prevent endwise movement of the wheel on the axle-joint and the rattling noise usually consequent on such movements. The prongs of the wear-compensator, by extending into the grooves of the nut, prevent the said compensator from revolving independently of the nut, and of being revolved by friction of the wheel-hub while the wheel may be in revolution.

The purpose of the compensator is not only to do away with washers, as ordinarily used, but to compensate, as explained, for wear of the wheel-box and the journal-shoulder.

One ring F will usually answer on the nut; but two of such rings may be used when desirable, one serving as a check or fastener to the other.

I claim—

The combination, with a carriage-wheel hub and the axle thereof, of the nut screwed upon the axle-journal and grooved and screw-threaded externally and internally, as described, the wear-compensator, (or ring having prongs to enter the grooves of the nut,) and one or more rings, the latter being screwed upon the external screw of the nut, and all being arranged and to operate substantially as set forth.

JOSEPH KENT.

Witnesses:
WM. BATCHELDER,
ARTHUR W. HARRIS.